(12) United States Patent
Hiraga et al.

(10) Patent No.: US 7,729,614 B2
(45) Date of Patent: Jun. 1, 2010

(54) DATA DISTRIBUTION SYSTEM AND METHOD

(75) Inventors: Takashi Hiraga, Osaka (JP); Nobutaka Tanigaki, Osaka (JP); Ichiro Ueno, Osaka (JP); Noritaka Yamamoto, Osaka (JP); Toshiko Mizokuro, Osaka (JP); Norio Tanaka, Tokyo (JP)

(73) Assignees: National Institute of Advanced Industrial Science and Technology, Tokyo (JP); Dainichiseika Color & Chemicals Mfg., Co., Ltd., Tokyo (JP)

( * ) Notice: Subject to any disclaimer, the term of this patent is extended or adjusted under 35 U.S.C. 154(b) by 590 days.

(21) Appl. No.: 11/709,149

(22) Filed: Feb. 22, 2007

(65) Prior Publication Data

US 2007/0201088 A1    Aug. 30, 2007

(51) Int. Cl.
*H04B 10/20* (2006.01)
*H04J 14/00* (2006.01)

(52) U.S. Cl. .......................... 398/60; 398/66
(58) Field of Classification Search .............. 398/60, 398/66, 67, 68, 69, 70, 71, 72
See application file for complete search history.

(56) References Cited

U.S. PATENT DOCUMENTS

2003/0194241 A1* 10/2003 Farmer ................... 398/167.5

2004/0141747 A1* 7/2004 Kenny et al. ................. 398/71
2005/0248844 A1* 11/2005 Ueno et al. ................. 359/487

FOREIGN PATENT DOCUMENTS

WO    WO 2005081573 A1 *  9/2005

* cited by examiner

*Primary Examiner*—Nathan M Curs
(74) *Attorney, Agent, or Firm*—Wenderoth, Lind & Ponack, L.L.P.

(57) ABSTRACT

A data distribution system transmitting and receiving a large capacity of data such as image data smoothly without incurring a delay over an optical fiber line located between a data sever and a client device. In the data transmission system, a plurality of client devices are bus-connected through an optical fiber to a data server transmitting and receiving data as signal light. Each of the client devices has a client optical switch and is connected with a client access device. The client optical switch is structured with a thermal-lens forming element and a signal-light path shifting member. When any of the client devices forwards an access command to its own client access device, control light is irradiated from the client access device to the own client optical switch thus effecting a switchover. Thus, transmission data of from the data server is stored in a data storage of the relevant client device.

4 Claims, 2 Drawing Sheets

DATA DISTRIBUTION SYSTEM AND METHOD

BACKGROUND OF THE INVENTION

1. Field of the Invention

The present invention relates to a data distribution system and method including a plurality of client devices connected to a data server through optical fibers so that the client device is allowed to acquire data containing a large capacity image in a short time by use of a plurality of optical switches.

2. Description of the Related Art

It is a conventional practice to transmit data from the server to the client device (personal computer: PC) through an optical fiber in accordance with a packet transmission scheme. Where sending a large capacity of data such as image data according to the packet transmission scheme, a delay is incurred over the optical fiber line, thus requiring a long time for the client device to acquire the data completely.

In particular, recently it has been a frequent practice to send a large capacity of MRI or computed-tomographic image data from a PC or data collector in an examination room to a PC on a physician's desk so that the physician can conduct a diagnosis based upon the data. There is expected, in the future, an increasing tendency of transmitting and receiving such a large capacity of data by way of an optical fiber line, in the middle scale businesses and office besides in the hospital.

However, in the packet transmission scheme, there is a limitation in transmitting and receiving a large capacity of data at high speed, which is desired for improvement.

BRIEF SUMMARY OF THE INVENTION

It is an object of the present invention to provide a data distribution system and method that a large capacity of data such as image data can be transmitted and received smoothly without incurring a delay over an optical fiber line at between the data sever and the client device, on a network architected for an area comparatively small, e.g. a hospital or a medium-scale business or office.

In accordance with a first aspect of the present invention, there is provided a data distribution system comprising a plurality of client devices accessible to the internet through a first optical fiber, and bus-connected through a second optical fiber to a data server that transmits and receives data as signal light, the client devices each having a client optical switch and connected to a client access device having a laser light source that generates control light to the client optical switch, the client devices each being allowed to send an access command to the client access device connected therewith, and the client optical switch being structured with a thermal-lens forming element having a light-absorbing layer having a wavelength band to absorb control light but transmit signal light and using a thermal lens based on a distribution of a refractive index caused reversibly by a temperature rise of the light-absorbing layer at and around a region where control light is absorbed thus realizing, corresponding to a presence or absence of control light, a state that the signal light is allowed to exit at a usual spread angle when no control light is irradiated and no thermal lens is formed and a state that signal light is allowed to exit at an angle greater than the usual spread angle when control light is irradiated and a thermal lens is formed, and a signal-light path shifting member that allows the signal light, of from the thermal-lens forming element, in a portion exiting at a usual spread angle to pass as it is and shifts an optical path for a portion of the signal light, of from the thermal-lens forming element, in a portion exiting at an angle greater than the usual spread angle, whereby, in case any of the client devices forwards an access command to the client access device thereof, control light is irradiated to the client optical switch thereof from the client access device to thereby cause a switchover thus storing transmission data of from the image data server to a data storage of the relevant client device.

Preferably, the signal-light path selecting member is a holed mirror that allows the signal light to pass through a hole when the signal light is at a usual spread angle and shifts a direction of optical path of the signal light by means of a mirror portion of the holed mirror when the signal light is at an angle greater than the usual spread angle.

In accordance with a second aspect of the present invention, there is provided a data distribution method comprising connecting a plurality of client devices to the internet through a first optical fiber, and bus-connecting those through a second optical fiber to a data server that transmits and receives data as signal light, providing each of the client devices with a client optical switch, and connecting each of the client device to a client access device having a laser light source (LD) that generates control light to the client optical switch, using optical switches, as the client optical switches, each structured with a thermal-lens forming element having a light-absorbing layer having a wavelength band to absorb control light but transmit signal light and using a thermal lens based on a distribution of a refractive index caused reversibly by a temperature rise of the light-absorbing layer at and around a region where control light is absorbed thus realizing, corresponding to a presence or absence of control light, a state that the signal light is allowed to exit at a usual spread angle when no control light is irradiated and no thermal lens is formed and a state that signal light is allowed to exit at an angle greater than the usual spread angle when control light is irradiated and a thermal lens is formed, and a signal-light path shifting member that allows the signal light, of from the thermal-lens forming element, in a portion exiting at a usual spread angle to pass as it is and shifts an optical path for a portion of the signal light, of from the thermal-lens forming element, in a portion exiting at an angle greater than the usual spread angle, and forwarding an access command from the client device desired for a data acquisition request to the client access device thereof so that the relevant client access device can irradiate control light to the client optical switch thereof, thereby causing a switchover and storing transmission data of from the image data server to a data storage of the relevant client device.

Preferably, the signal-light path selecting member uses a holed mirror, allowing the signal light to pass through a hole when the signal light is at a usual spread angle and shifts a direction of optical path of the signal light by means of a mirror portion of the holed mirror when the signal light is at an angle greater than the usual spread angle.

DETAILED DESCRIPTION OF THE INVENTION

Description will now be made on the present invention by way of the embodiment thereof.

Figure 1:
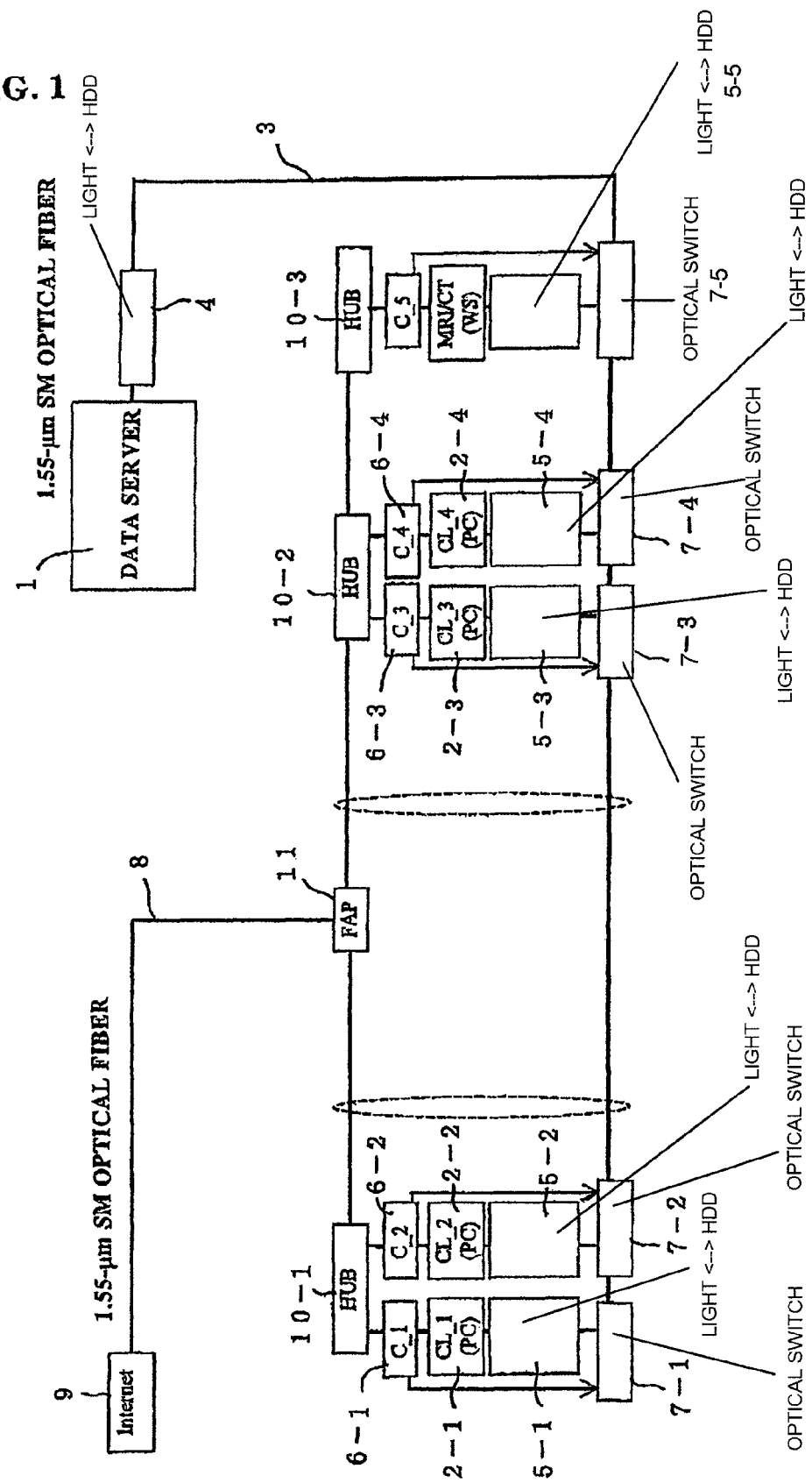
FIG. 1 is a diagram typically showing an arrangement of a data distribution system according to one embodiment of the present invention.
Figure 2A:
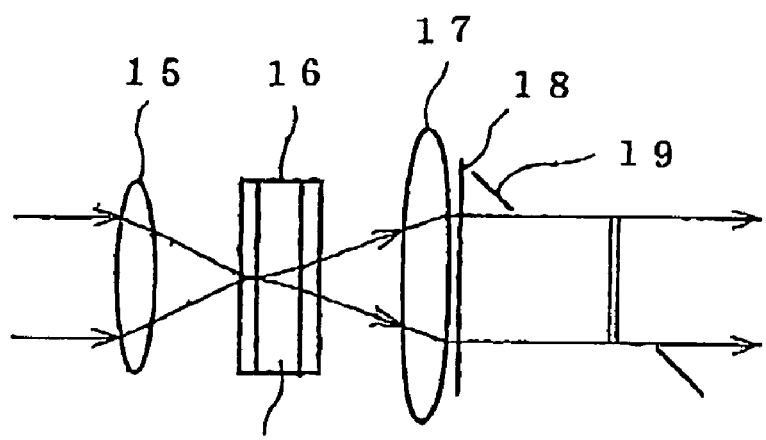
FIGS. 2A and 2B are explanatory views of an optical switch used in the data distribution system.
Figure 2B:
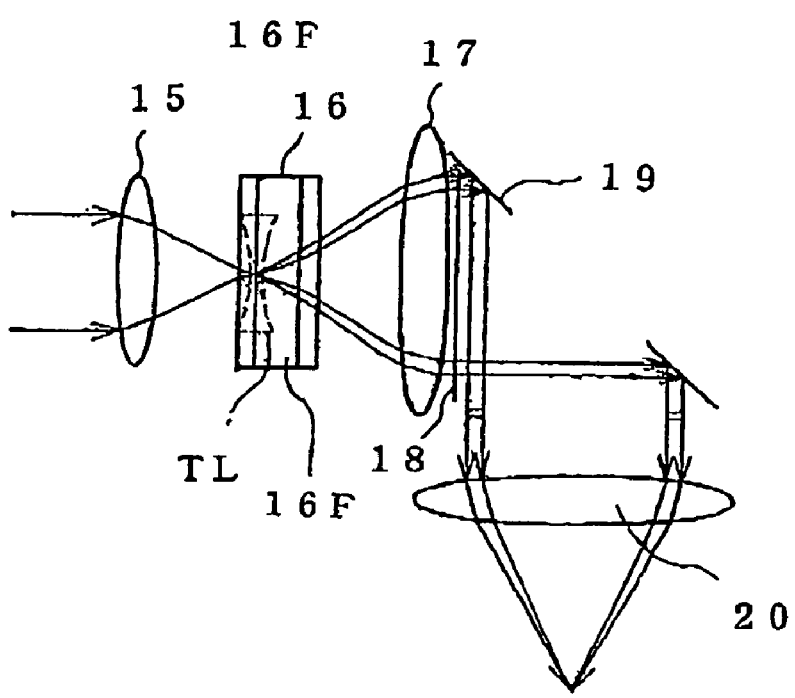

FIG. 1 is a diagram typically showing a configuration of a data distribution system according to an embodiment of the present invention. FIGS. 2A and 2B are figures typically showing a structure of an optical switch used in the data distribution system of the present embodiment.

A data server 1 has a data storage that stores various types of data including image (still and moving image) data. Cooperatively with a client device 2 and an optical fiber 3, the server constitutes a network for transmitting and receiving data so that it can be provided as a virtual drive on a PC. The data server 1 can be served as a hard disk drive (HDD) having a serial ATA of 300 M bytes/second, for example. However, the storage device is desirably selected for its type and transfer rate. Meanwhile, the client device 2 in the embodiment includes four devices 2-1-2-4 for convenience sake but may be desirably provided in the given number. Alternatively, an MRI or computed tomographic data collector may be connected as a client device 2. The data server 1 has an optical-electrical (O-E) converter 4 for converting an optical signal into an electric signal and an electric signal into an optical signal.

For the client devices 2-1-2-4, HDD-equipped PCs, for example, can be utilized as data storages thereof. The client devices 2-1-2-4 have HDDs as data storages but can use other types of storage devices. Meanwhile, the client devices 2-1-2-4, have optical-electrical (O-E) converters 5-1-5-5 for converting an electric signal into an optical signal and an optical signal into an electric signal, and are connected to client access devices 6-1-6-4. The client access devices 6-1-6-4 each have a laser light source (LD) that generates control light to a client optical switch 7-1-7-5 the client device 2-1-2-4 possesses. Between the client devices 2-1-2-4, a network is architected through the optical fiber 8 thus allowing for access to the Internet 9. Accordingly, the client device 2-1-2-4 is accessible to the Internet 9 by way of the client access device 6-1-6-4, hub 10-1, 10-2, 10-3 and FAP (floor access point) 11.

Meanwhile, the client device 2-1-2-4 is arranged to forward to the client access device 6-1-6-4 an access command to on/off-control the client optical switch 7-1-7-5. When issued a command for an access to any of the client access devices 6-1-6-4 ("on" signal), the relevant laser light source irradiates control light to its own client optical switch (any of 7-1-7-5). When issued an access cease command, the irradiation of control light is ceased.

With reference to FIGS. 2A and 2B, description is now made in detail on the client optical switch 7-1-7-5. From now on, the client optical switch 7-1-7-5 is also referred to as an optical switch.

When transmitting data from the data server 1 to the client server 2-1-2-4, the optical switch fetches data as signal light of from the data server 1. It also fetches control light from the laser light source of the client access device 6-1-6-4. The optical switch has a lens 15, a thermal-lens forming element 16, a lens 17, a filter 18, a holed mirror 19 and a lens 20.

The lens 15 is to converge the collimated light, into which the signal light and control light are fetched coaxially with superposition, into a focus within the thermal-lens forming element 16. The thermal-lens forming element 16 has a light-absorbing layer 16F with a wavelength band that is absorbent of control light and transmissive for signal light. The light-absorbing layer 16F is to form a thermal lens TL based on the distribution of a refractive index caused reversibly due to a temperature rise at and around the region where control light is absorbed. Namely, when signal light only enters, the thermal-lens forming element 16 allows the signal light to exit at the usual spread angle (open angle). When signal light and control light enter at the same time, a thermal lens TL is formed allowing the signal light and control light to exit at a spread angle greater than the usual spread angle. The lens 17 serves to make the exiting signal light and control light into collimated light. The filter 18 is to block control light but allows signal light to transmit. The holed mirror 19 allows the usual spread of signal light to pass through its hole. The signal light, greater in spread angle than the usual spread angle, is to be reflected upon a mirror portion into a ring beam thus shifting the direction of the optical path. The lens 20, provided downstream of the holed mirror 19, is to converge the signal light passed the hole of the holed mirror 19.

The client optical switch 7-1-7-5 assumes on during the incidence of control light (in a ring beam state) and off during the non-incidence of control light (in a passage-though-hole state).

The light-absorbing layer 16F of the thermal-lens forming element 16 can use a pigment having, say, a wavelength band where a wavelength 1550 μm of signal light is allowed to transmit while a wavelength 650 nm of control light is absorbed. Phthalocyanine pigment, soluble in solvent, is suitably used as a pigment having such a wavelength band. More specifically, copper (II) 2,9,16,23-tetra-tert-butyl-29H,31H-phthalocyanine, for example, can be used. Naturally, a desired combination of wavelengths can be used provided that a particular wavelength of signal light is allowed to transmit while another particular wavelength of control light is absorbed.

The client device 2-1-2-4 can be accessed to the Internet 9, similarly to the usual practice method.

Now explanation is made on the operation of the optical exchanger system according to the embodiment of the invention. It is herein exemplified that the client device 2-2 desires to acquire data from the data server 1.

When the client device 2-2 issues a command for access, it is sent to the client access device 6-2. The access device 6-2 irradiates control light to the client optical switch 7-2 thereby turning on the client optical switch 7-2. At this time, the signal light becomes a ring beam and the optical path is shifted toward the client device 6-2. At this time, the client optical switches 7-1, 7-3, 7-4 of the client devices 2-1, 2-3, 2-4 turn off. The client optical switch, turned off, allows data to pass through. Thus, data is successively sent only to the client device 2-2 requested to acquire data. From the data server 1, data is forwarded successively to the optical fiber 3 at a transfer rate of 300 M bytes/second. The client device 2-2 is allowed to fetch data for a transfer time computed 300 M bytes/second according to data amount, due to the switchover toward a ring beam of the client optical switch 7-2 according to the control light. When completing the fetching of data, the client device 2-2 sends an access cease command to the client access device 6-2 so that the client access device 6-2 ceases the irradiation of control light. This turns off the client optical switch 7-2 (state allowing signal light to pass the hole). Thus, the client device 2-2 completes the storage of data in its HDD.

In this manner, in the data distribution system of the embodiment, data is successively forwarded only to the client device requested for acquisition, as in the conventional telephony crossbar exchange. Accordingly, data can be transmitted and received at high rate without incurring a delay over the optical fiber line.

Data transfer is also possible to the data server 1 from the client device 2-1-2-4 or from an MRI, a computed tomography or the like.

Although the data distribution system of the present invention was explained so far by way of the embodiment, the present invention is not limited to the foregoing embodiment but can be changed or modified in various ways.

For example, although the data collector such as an MRI or computed tomography was connected as an equivalent one to the client device 2, the present invention is not necessarily required for such an access. Alternatively, other types of data collectors may be connected.

Meanwhile, the embodiment used the holed mirror as a signal-path change member, which is not limitative. A member in a suitable type may be used provided that the signal path can be changed, e.g. a member formed of a transparent material in its hole area.

What is claimed is:

1. A data distribution system comprising:
   a plurality of client devices accessible to the internet through a first optical fiber, and bus-connected through a second optical fiber to a data server that transmits and receives data as signal light, such that each client device of the plurality of client devices includes a respective client optical switch and is connected to a client access device having a laser light source that generates control light to the respective client optical switch, and such that each client device of the plurality of client devices is allowed to send an access command to the client access device connected therewith
   wherein each respective client optical switch is structured with a respective thermal-lens forming element having a light-absorbing layer having a wavelength band to absorb control light but transmit signal light and using a thermal lens based on a distribution of a refractive index caused reversibly by a temperature rise of the light-absorbing layer at and around a region where the control light is absorbed thus realizing, corresponding to a presence or an absence of the control light, (i) a state that the signal light is allowed to exit at a usual spread angle when no control light is irradiated and no thermal lens is formed, and (ii) a state that the signal light is allowed to exit at an angle greater than the usual spread angle when the control light is irradiated and the thermal lens is formed,
   wherein each respective client optical switch is structured with a respective signal-light path shifting member that (i) allows the signal light, transmitted from the thermal-lens forming element at the usual spread angle, to pass therethrough, and (ii) shifts an optical path for a portion of the signal light transmitted from the thermal-lens forming element at an angle greater than the usual spread angle, and
   wherein, when a client device of the plurality of client devices forwards the access command to the client access device connected therewith, the control light is irradiated to the client optical switch of the client device forwarding the access command from the client access device connected therewith to thereby cause a switchover thus storing transmission data from the data server to a data storage of a relevant client device.

2. The data distribution system according to claim 1, wherein the signal-light path shifting member is a holed mirror that (i) allows the signal light to pass through a hole when the signal light is at the usual spread angle and (ii) shifts a direction of the optical path of the signal light by means of a mirror portion of the holed mirror when the signal light is at an angle greater than the usual spread angle.

3. A data distribution method comprising:
   connecting a plurality of client devices to the internet through a first optical fiber, and bus-connecting the plurality of client devices through a second optical fiber to a data server that transmits and receives data as signal light;
   providing each client device of the plurality of client devices with a respective client optical switch, and connecting each client device of the plurality of client devices to a client access device having a laser light source that generates control light to the respective client optical switch;
   using optical switches, as the client optical switches, each structured with (A) a respective thermal-lens forming element having a light-absorbing layer having a wavelength band to absorb control light but transmit signal light and using a thermal lens based on a distribution of a refractive index caused reversibly by a temperature rise of the light-absorbing layer at and around a region where the control light is absorbed thus realizing, corresponding to a presence or an absence of the control light, (i) a state that the signal light is allowed to exit at a usual spread angle when no control light is irradiated and no thermal lens is formed, and (ii) a state that the signal light is allowed to exit at an angle greater than the usual spread angle when the control light is irradiated and the thermal lens is formed, and (B) a respective signal-light path shifting member that (i) allows the signal light, transmitted from the thermal-lens forming element, at the usual spread angle, to pass therethrough, and (ii) shifts an optical path for a portion of the signal light, transmitted from the thermal-lens forming element at an angle greater than the usual spread angle; and
   forwarding an access command from a client device of the plurality of client devices that is desired for a data acquisition request to the client access device connected therewith, so that a relevant client access device connected therewith can irradiate the control light to the respective client optical switch of the client device forwarding the access commend, thereby causing a switchover and storing transmission data from the data server to a data storage of a relevant client device.

4. The data distribution method according to claim 3, wherein the signal-light path shifting member uses a holed mirror, allowing the signal light to pass through a hole when the signal light is at the usual spread angle and shifting a direction of the optical path of the signal light by means of a mirror portion of the holed mirror when the signal light is at an angle greater than the usual spread angle.

* * * * *